(No Model.)
T. MILLEN.
BRAKE FOR RAILWAY CARS.
No. 534,752. Patented Feb. 26, 1895.
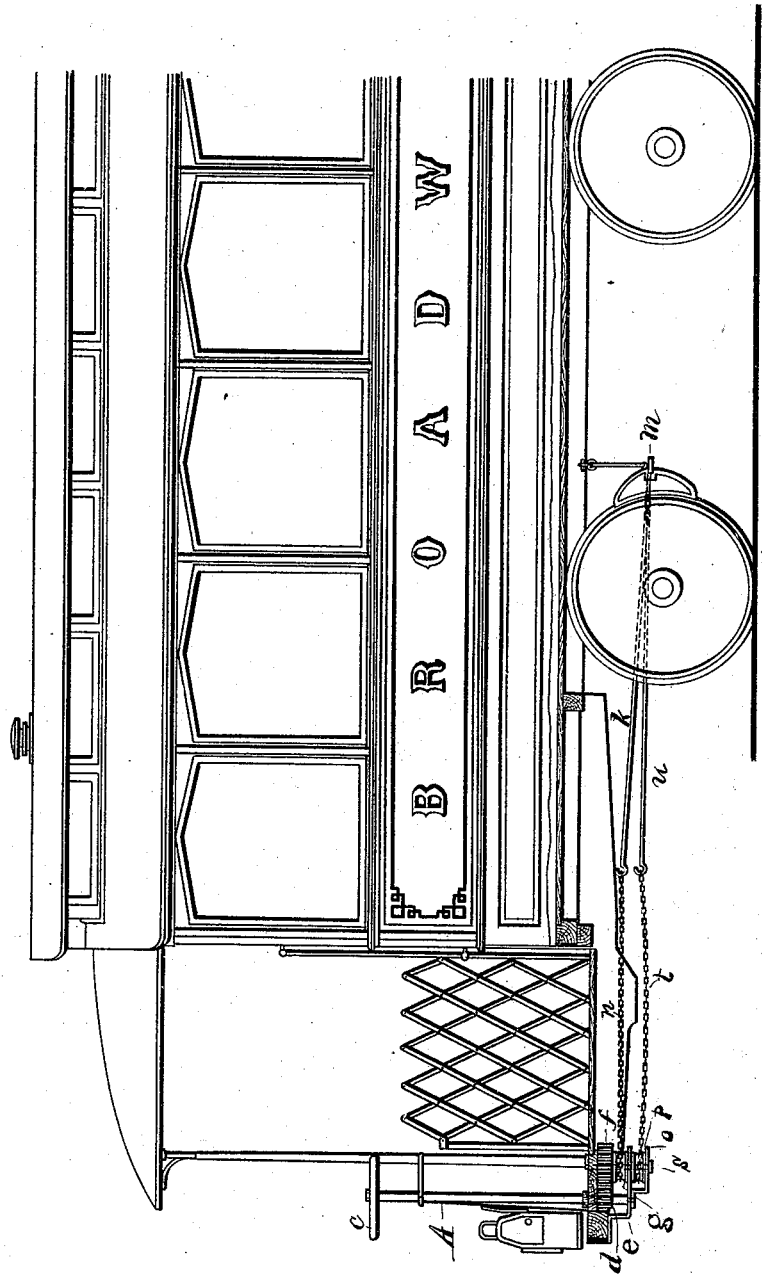

UNITED STATES PATENT OFFICE.

THOMAS MILLEN, OF NEW YORK, N. Y.

BRAKE FOR RAILWAY-CARS.

SPECIFICATION forming part of Letters Patent No. 534,752, dated February 26, 1895.

Application filed October 25, 1894. Serial No. 526,981. (No model.)

*To all whom it may concern:*

Be it known that I, THOMAS MILLEN, of the city, county, and State of New York, have invented a new and useful Improvement in Brakes, of which the following is a specification.

This invention relates to brakes for cable, electric, traction or horse cars, and has for its object, to provide an auxiliary or safety brake as will be hereinafter explained.

My invention is illustrated in the accompanying drawing which forms a part of this specification, and in which similar letters of reference indicate corresponding parts.

I have only illustrated my invention in one figure a side elevation, believing that to be sufficient, as it fully illustrates the device.

As shown by the drawing A represents the brake standard which carries the hand wheel, C. The standard is secured to the dash of the car and passes down through the car platform in the usual way, with its lower end resting upon and journaled within the strap, *e*. The lower end of the standard is provided with a fixed gear wheel, *d*, which revolves with the standard and which engages or meshes with a longer gear wheel, as *f*, supported by the strap *e*. To the gear wheel, *f* is secured (usually cast with, and forming a part thereof) the sprocket wheel *g*, which revolves with the gear wheel.

The hook or brake rod *k* is secured to the brake beam M either direct or by the usual system of levers, and is hooked to the chain N, as illustrated. The chain N has its opposite end secured to the sprocket wheel *g*. Thus, when the hand wheel is revolved, by means of the small gear wheel *d*, it causes the larger gear wheel *f* and sprocket wheel *g* to revolve, which applies the brake. By means of such a gearing applied in this manner, I am enabled to provide sufficient power to the brake to stop the car very quickly.

To the lower side of the strap *e* is a strap as *o* which carries an additional sprocket wheel *p*, the latter being mounted upon the same shaft as the gear wheel *f* and sprocket wheel *g*, all three being keyed to the shaft *s* so that they all revolve together. The sprocket wheel *p* is provided with a chain *t* and brake rod *u* constructed and arranged precisely the same as the one above described, except that it is left comparatively loose so that it does not receive any strain unless the first one should become broken, in which case it takes the strain and operates the same as the former one. Thus, it is impossible to have an accident or a "runaway car" from a broken brake rod or chain, which is now frequently the case.

Having thus described my invention, what I claim, and desire to secure by Letters Patent, is—

The standard A carrying the hand wheel *c* and provided on its lower end with the gear wheel *d* which engages with and operates the large gear wheel *f* and sprocket wheel *g*, in combination with the auxiliary sprocket wheel "*p*" and suitable brake chains and rods substantially as and for the purpose specified.

In testimony that I claim the foregoing improvement in brakes, as above described, I have hereunto set my hand this 13th day of October, 1894.

THOMAS MILLEN.

Witnesses:
W. E. BOISE,
R. C. SHIMEALL.